United States Patent
Williams

(10) Patent No.: US 6,957,042 B2
(45) Date of Patent: Oct. 18, 2005

(54) PACKET BASED BACKHAUL CHANNEL CONFIGURATION FOR A WIRELESS REPEATER

(75) Inventor: Terry L. Williams, Melbourne, FL (US)

(73) Assignee: Airnet Communications Corporation, Melbourne, FL (US)

( * ) Notice: Subject to any disclaimer, the term of this patent is extended or adjusted under 35 U.S.C. 154(b) by 652 days.

(21) Appl. No.: 09/755,752

(22) Filed: Jan. 5, 2001

(65) Prior Publication Data

US 2001/0031646 A1    Oct. 18, 2001

Related U.S. Application Data

(60) Provisional application No. 60/175,350, filed on Jan. 10, 2000.

(51) Int. Cl.[7] .............................. H04B 3/36; H04B 7/14

(52) U.S. Cl. ............................ 455/7; 455/452.1

(58) Field of Search ..................... 455/7, 11.1, 450, 455/452.1, 452.2, 456.2, 561, 445, 15, 34.1, 455/507, 509, 510, 511; 370/352, 351, 315, 370/319, 320, 321, 329, 330, 316, 341, 431, 370/468, 327, 328; 340/870.02

(56) References Cited

U.S. PATENT DOCUMENTS

| | | | |
|---|---|---|---|
| 4,887,265 A | | 12/1989 | Felix |
| 5,404,392 A | | 4/1995 | Miller et al. |
| 5,592,470 A | * | 1/1997 | Rudrapatna et al. ......... 370/320 |
| 5,666,364 A | * | 9/1997 | Pierce et al. ................ 370/455 |
| 5,719,902 A | | 2/1998 | Quick et al. |
| 5,790,551 A | | 8/1998 | Chan |
| 5,832,379 A | | 11/1998 | Mallinckrodt |
| 5,923,648 A | * | 7/1999 | Dutta ......................... 370/280 |
| 5,970,410 A | | 10/1999 | Carney et al. |
| 5,974,325 A | * | 10/1999 | Kotzin et al. ............... 455/450 |
| 6,167,270 A | | 12/2000 | Rezaiifar et al. |
| 6,300,881 B1 | * | 10/2001 | Yee et al. ............... 340/870.02 |
| 6,404,769 B1 | * | 6/2002 | Kapoor ...................... 370/398 |
| 6,584,080 B1 | * | 6/2003 | Ganz et al. ................. 370/315 |
| 2002/0077151 A1 | * | 6/2002 | Matthews et al. .......... 455/561 |

* cited by examiner

Primary Examiner—Nick Corsaro
Assistant Examiner—Tu X Nguyen
(74) Attorney, Agent, or Firm—Sacco & Associates, PA

(57) ABSTRACT

A method and system for improved backhaul efficiency dynamically assigns packet based backhaul channels in a cellular communications system which includes at least one wireless repeater and a base station. The method and system can perform packet based backhaul communications regardless of the translating repeater to mobile communications format used. The method and system can also use a single backhaul channel to transmit packets between multiple repeaters and the base station.

22 Claims, 7 Drawing Sheets

PACKET BASED BACKHAUL CHANNEL CONFIGURATION FOR A WIRELESS REPEATER

CROSS REFERENCE TO RELATED APPLICATIONS

This application claims the benefit of U.S. Provisional Application No. 60/175,350 entitled "PACKET BASED BACKHAUL CHANNEL CONFIGURATION FOR A WIRELESS REPEATER" filed Jan. 10, 2000, the entirety of which is incorporated herein by reference.

BACKGROUND OF THE INVENTION

1. Field of the Invention

This invention relates to wireless communication systems and in particular to a method for a plurality of backhaul communication signals to concurrently use the same backhaul channel during transmissions between repeaters and a base station.

2. Description of Relevant Art

Many phone networks, including cellular phone networks, operate as circuit-switched networks. Circuit-switched refers to a type of network in which a particular physical path, commonly referred to as a data path, is obtained for and dedicated to each connection between two end-points in the network. The particular data path used for the connection is dedicated for exclusive use by the network endpoints during the entire duration of the connection. Thus, during all times during the connection, the physical path used for the transmission cannot be used for any other purpose, such as use by other users. Circuit-switched networks may be contrasted with packet-switched networks.

Packet-switched describes a type of network in which relatively small units of data called packets are routed through a network based on a destination address contained within each packet. Breaking communications down into discrete packets allows the same data path to be shared during a given time interval by multiple users in the network.

Higher efficiency transmission of data over cellular networks has been accomplished by transmitting data in a packetized format over vacant voice channels. Voice channels are generally vacant during approximately 50% of each call, since participants in a conversation generally take turns talking. One variant of packet data transmission is called Cellular Digital Packet Data (CDPD).

CDPD is a specification for supporting wireless access to the Internet and other public packet-switched networks. Cellular telephone and modem providers that offer CDPD make it possible for mobile users to get access to the Internet at theoretical data rates of up to 19.2 Kbps. Because CDPD is an open specification that adheres to the layered structure of the Open Systems Interconnection (OSI) model, it has the ability to be extendable into the future. CDPD supports both the Internet's IP protocol and the ISO Connectionless Network Protocol (CLNP). There is also a circuit-switched version of CDPD, called CS CDPD, which can generally only be used to improve system efficiently when traffic is expected to be heavy enough to warrant a dedicated connection.

CDPD has been implemented in analog cellular networks such as the Advanced Mobile Phone System (AMPS) in U.S. Pat. No. 5,404,392 to Miller et al. CDPD has also been implemented in digital cellular time division multi-access (TDMA) networks in U.S. Pat. No. 5,790,551 to Chan.

Some cellular systems use repeaters, such as translating repeaters, to lower the cost per channel in relatively low cellular usage zones. Some translating repeaters, such as the AirSite® repeater system offered by AirNet Communications Corporation of Melbourne, Fla., make use of existing "in-band" RF carrier frequencies for backhaul cellular communications traffic. As used herein, the term "in-band" refers to carrier frequencies that are within the frequency spectrum allocation assigned to the service provider for providing cellular communications services to mobile subscribers. Use of in-band radio frequency channels for backhaul cellular communications traffic from remote translating repeater sites eliminates costly wireline T1 or microwave connections.

While the use of in-band radio frequency channels for backhaul cellular communications traffic has distinct advantages, it also has some drawbacks. For example, in conventional wireless translating repeaters, a full duplex backhaul channel requires a pair of corresponding uplink and downlink backhaul RF carrier frequencies. Use of such in-band channels for providing a backhaul link necessarily reduces the number of channels available to a service provider on which to communicate with mobile subscribers. As mobile subscriber traffic increases, additional RF carrier channels must be allocated for the backhaul function. Thus, since there are a finite number of RF channels that can be allocated for use as backhaul channels and a finite number of RF channels that can be allocated as groundlink channels, the number of translating repeaters and mobile subscribers that may be supported by a given cellular network is correspondingly limited.

Exclusive assignment of backhaul frequencies results from currently used circuit switched technology for the backhaul. Using circuit switched technology, calls received by the translating repeater from a mobile user and re-transmitted on the uplink to the base transceiver station (BTS) requires the allocation, by the BTS, of at least a portion of the bandwidth of the backhaul channel. The allocation is an exclusive allocation for the entire duration of the call.

Thus, while information is being sent from the mobile user to the translating repeater and from the translating repeater to the BTS, the bandwidth of the downlink backhaul channel remains exclusively allocated to the recipient of the call for transmitting information of their own to the mobile user. This is the case even though while the mobile user is talking to the call recipient, the call recipient is generally merely listening to the information received from the mobile user. Similarly, the uplink backhaul channel remains allocated and unavailable for other users as it sits idle while the call recipient is talking to the mobile user.

In the case of voice networks, information is only transmitted along the allocated bandwidth of a given voice channel about 50% of the time. Accordingly, the efficiency of cellular systems having translating repeaters could be substantially improved if data could be transmitted by another translating repeater served by a given host BTS during time intervals when the allocated backhaul bandwidth of an initiated cellular call was not being used. This would allow the efficiency of transmissions of voice and other information over the backhaul channel to be greatly increased. This efficiency increase is expected to be on the order of approximately 200%, or approximately twice the effective backhaul network traffic capacity compared to a circuit switched backhaul network. Similar efficiencies may also be realized on the downlink backhaul channel using the same method. Backhaul efficiencies could be further increased if use of vacant voice channel intervals could be combined with other compatible techniques which also improve backhaul channel efficiency.

SUMMARY OF THE INVENTION

The invention includes a method for improved backhaul efficiency for use in a wireless cellular communication system. The system includes a base station and at least one repeater communicating over a wireless backhaul link for communicating with a plurality of mobile subscribers. The method includes the step of dynamically assigning for the backhaul link at least one packet channel for transmission of selected packets on a backhaul signal for a mobile subscriber. The packet channel includes an RF frequency and a channel definition. Selected packets are then transmitted on the assigned packet channels between the at least one repeater and the base station. The method can also include the step of performing the assigning step in response to a request for communicating over the backhaul signal from a mobile subscriber.

The request can also include a priority field. If a priority field is included in the request, the method can further include comparing data priority fields to determine whether to terminate transmission of a lower priority transmission to allow transmission of a higher priority transmission. This step can be useful when no other channel is available to service the higher priority transmission. The method can also include the step of dynamically reassigning a portion of the assigned packet channel for transmission of a second backhaul signal.

The channel definition can include a set of parameters which define the packet channel, the parameters including selected packets which can be sent over the assigned packet channel and the number frames allocated for transmission of the selected packets. The channel definition can also include an identified time for transmission of the selected packets.

The backhaul signal can include traffic or control data. User traffic can include voice traffic. To further improve backhaul efficiency, packets can be transmitted over the backhaul link using a higher order modulation as compared to a ground link between the at least one repeater and the mobile subscriber. The method can also include the step of converting between a packet based backhaul signal and a non-packet based ground link signal. A single Backhaul channel can also be used to transmit packets between multiple repeaters and the base station.

A system for improved backhaul efficiency in a wireless cellular communication system includes a base station and at least one repeater communicating over a wireless backhaul link for communicating with a plurality of mobile subscribers. The system includes a structure for dynamically assigning for the backhaul link at least one packet channel for transmission of selected packets on a backhaul signal for a subscriber. The packet channel includes an RF frequency and a channel definition. The system also includes a structure for transmitting the selected packets on the packet channel between the at least one repeater and the base station.

The system can also include a structure for performing the assigning step in response to a request for communicating over the backhaul signal for mobile subscribers. The request can include a data priority field. If data priority fields are used, the system can include a structure for comparing data priority fields to determine whether to terminate transmission of a lower priority transmission to allow transmission of a higher priority transmission. The system can also include a structure for dynamically reassigning a portion of the assigned packet channel for transmission of a second backhaul signal.

Channel definitions can include a set of parameters which define the packet channel, the parameters comprising a number of the selected packets which can be sent over the assigned packet channel and the number frames allocated for transmission of the selected packets. The channel definition can further include an identified time for transmission of the selected packets.

The backhaul signal can include user traffic or control data. User traffic can be comprised of voice traffic. The system can further include a structure for transmitting packets over the backhaul link using a higher order modulation as compared to a ground link signal between the at least one repeater and the subscriber. The system can also include a structure for converting between a packet based backhaul signal and a non-packet based groundlink signal. A single backhaul channel can be used by the system to transmit packets between multiple repeaters and the base station.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

Figure 1:
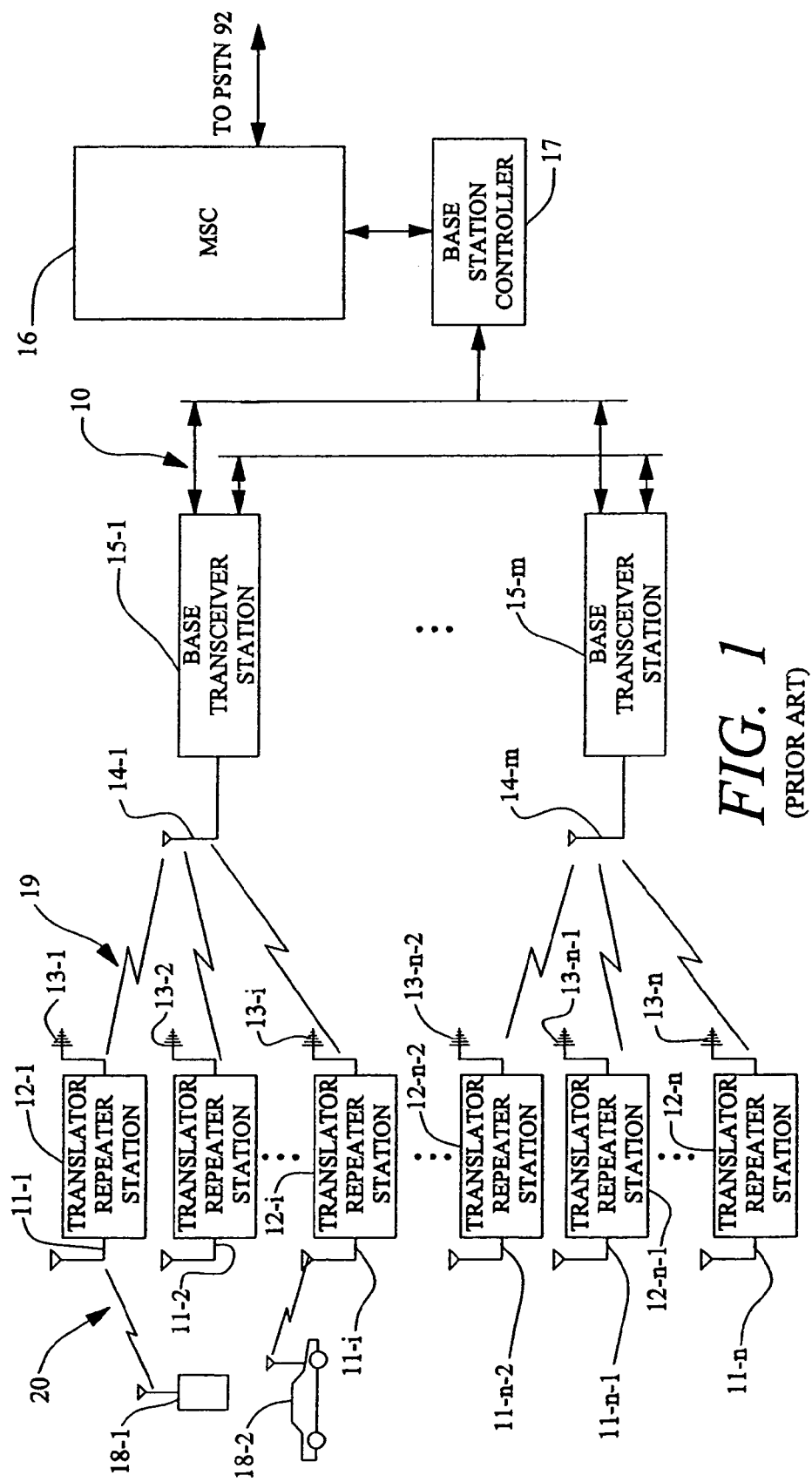
FIG. 1 is a block diagram of a wireless communications system deploying a plurality of wireless translating repeaters and base transceiver stations.

FIG. 1 is a block diagram of a conventional wireless communications system such as a Personal Communication System ("PCS") or other similar system 10. In this system, omni-directional translating repeaters 12-1 . . . 12-n are deployed in peripheral cells surrounding broadband base transceiver stations ("BTS"), such as 15-1 . . . 15-m. Clusters of cells are each supported by a plurality of translating repeaters, such as translating repeaters 12-1 . . . 12-i. Cell clusters are generally associated with a single BTS, such as 15-1. Translating repeaters within a cell cluster are generally exclusively served or hosted by a "host BTS" positioned within a given cell cluster.

Cells having BTS 15-1 . . . 15-m positioned therein, generally do not require translating repeaters 12-1 . . . 12-n. Those skilled in the art will readily appreciate that non-translating repeaters or directional or sectorized translating repeaters may replace omni-directional translating repeaters 12-1 . . . 12-*n* in this system. However, for convenience, the system 10 will first be described using omni-directional translating repeaters 12-1 . . . 12-*n*.

The system 10 can include translator omni-directional antennas 11-1, 11-2 . . . 11-*i*, . . . 11-*n*-2, 11-*n*-1 and 11-*n* (collectively omni-directional antennas 11), translating repeaters 12-1, 12-2, . . . 12-*i*, . . . 12-*n*-2, 12-*n*-1 and 12-*n* (collectively translating repeaters 12), translating repeater antennas 13-1, 13-2, . . . 13-*i*, . . . 13-*n*-2, 13-*n*-1 and 13-*n* (collectively translating repeater directional antennas 13), BTS directional antennas 14-1, . . . 14-*m* (collectively BTS antennas 14), and broadband base transceiver stations 15-1, . . . 15-*m* (collectively BTSs 15). The system 10 can further include a mobile telephone exchange/mobile telephone switching office ("MTSO") 16, one or more base station controllers 17 and a plurality of mobile users 18-1 and 18-2.

Translating repeaters 12 receive radio signals from mobile users 18 through omni-directional antennas 11 and forward a frequency shifted version of the received signal to BTS 15 through translating repeater directional antennas 13. Likewise, radio signals transmitted from BTS 15 through BTS antennas 14 are frequency shifted by translating repeater 12 before being forwarded to mobile users 18. BTS 15 demodulate signals received from translating repeaters 12 through BTS antennas 14 and connects these signals to the Public Switched Telephone Network 92 (PSTN) through MTSO 16. In addition, in the transmit direction, BTS 15 modulates signals received from the PSTN 92 through MTSO 16 to format them for transmission through BTS antennas 14-1 . . . 14-*m* to their respective hosted translating repeaters 12.

Figure 2:
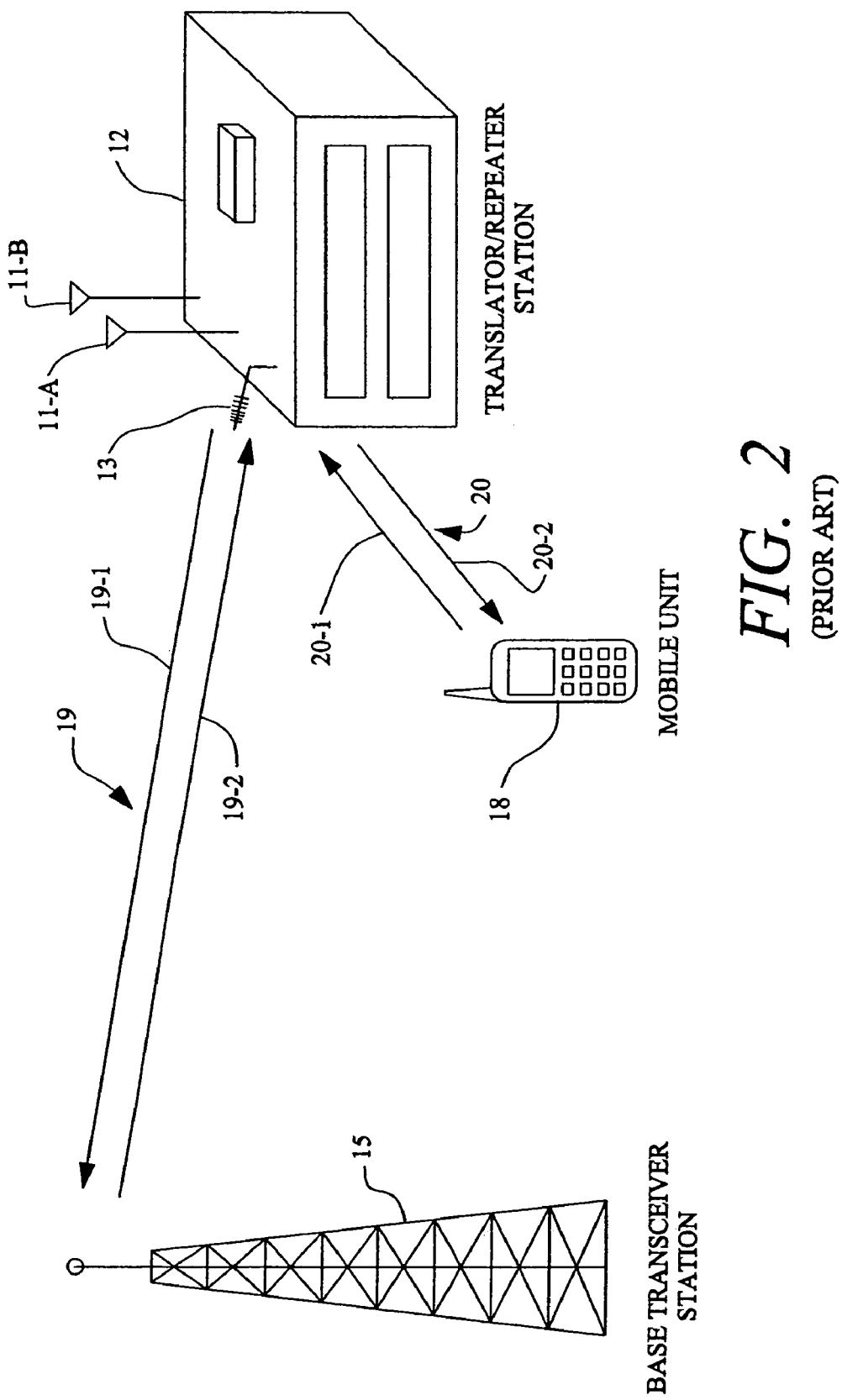
FIG. 2 is an exemplary arrangement of the wireless communications system of FIG. 1, showing wireless links deployed through a translating repeater.

FIG. 2 illustrates the basic function of a translating repeater 12. Frequency shifted signals transmitted by translating repeaters 12 avoid multi-path effects common in cellular systems using simple repeaters. Applied to translating repeaters, a frequency pair or duplex frequency is used so that BTS 15 to translating repeater 12 backhaul transmissions are at a different frequency than translating repeater 12 to BTS 15 backhaul transmissions. Each backhaul signal is simply a frequency shifted version of the same signal received by the mobile user 18 on the downlink, and a frequency shifted version of the same signal transmitted by the mobile user 18 on the uplink.

Translating repeater 12 transmits a frequency shifted version of the signals received from mobile users 18 to BTS 15 and receives signals from BTS 15 through backhaul channel 19. Backhaul channel 19 is comprised of uplink backhaul channel 19-1 and downlink backhaul channel 19-2. Preferably, different carrier frequencies are used for uplink backhaul channel 19-1 and downlink backhaul channel 19-2. Similarly, translating repeater 12 transmits a frequency shifted version of signals received from BTS 15 to mobile users 18 and receives signals from mobile users 18 through groundlink channel 20. Groundlink channel 20 is comprised of uplink groundlink channel 20-1 and downlink ground channel 20-2, preferably deployed using different carrier frequencies to allow simultaneous transmission in both directions.

Because BTS 15 is generally stationary, translating repeaters 12 preferably employ a directional antenna 13 pointed towards BTS 15 to improve transmission and reception of signals over backhaul channel 19. In contrast, because mobile users 18 are generally not stationary and the translating repeater 12 is not sectorized, translating repeater 12 preferably employs one or more omni-directional antennas 11A and 11B respectively to transmit and receive signals over groundlink channel 20.

Figure 3A:
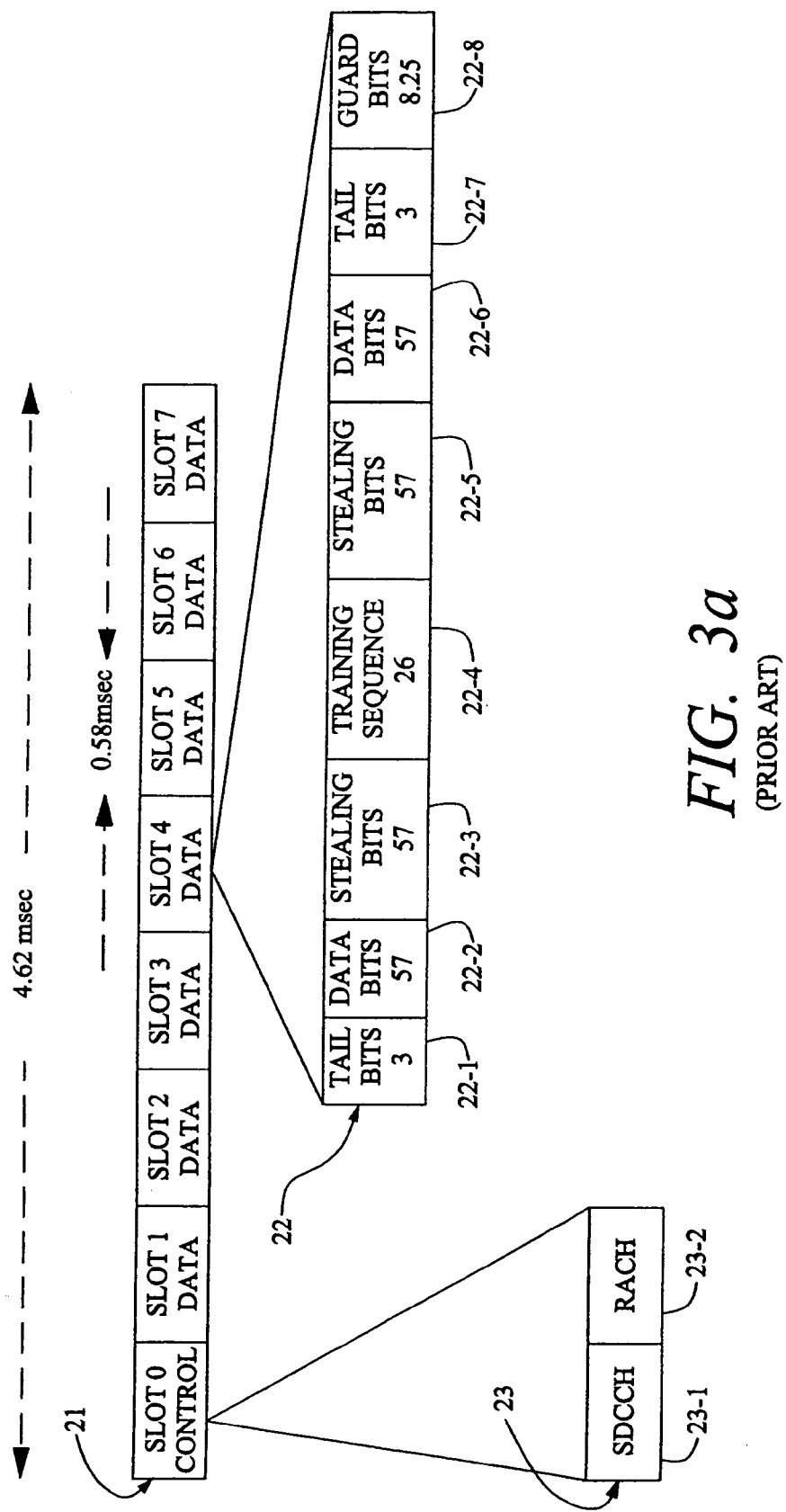
FIG. 3a illustrates an uplink GSM-type TDMA frame which includes a dedicated control channel.

Communications between mobile users 18, repeaters 12, and the BTS 15 can be performed using a variety of multiplexing schemes that are well known in the art. For example, a time division multiplex (TDM) scheme may be used for this purpose. FIG. 3*a* shows a typical uplink backhaul GSM TDMA frame 21 comprising eight time slots, used for transmission from a translating repeater 12 to BTS 15. The depicted GSM TDMA frame has a duration of 4.62 milliseconds, comprising eight time slots each having a duration of approximately 0.58 milliseconds. Generally, for GSM-type TDMA implementations which use a single RF carrier, one time slot is dedicated to transmitting control information, while the remaining slots are available to transmit traffic information. Traffic channels can carry conversations or data, as well as information about the time slot itself.

Referring to FIG. 3*a*, slot 0 is a dedicated control channel while slots 1–7 support traffic. Typical formats for the traffic sub-channels and control sub-channels are shown in time slot details 22 and 23, respectively. Detail 22 of time slot 4 shows typical GSM format traffic sub-channels including tail bits 22-1 and 22-7 which are used to indicate the beginning and end of a time slot.

Data bits 22-2 and 22-6 contain the digitized call information, while training sequence bits 22-4 are used for equalization of multi-path signals. Stealing bits 22-3 and 22-5 are provided to indicate if suppression of time slot data and replacement with priority data is requested. Finally, guard bits 22-8 are provided to keep the individual slots from overlapping upon receipt. The number of bits contained in a typical traffic sub-channel is shown below the sub-channel designation in detail 22.

As noted earlier, in single TDMA RF carrier implementations, one slot will generally be a dedicated digital control channel. As shown in detail 23 of time slot 0, sub-channels in the uplink control time slot generally include a stand-alone dedicated control sub-channel (SDCCH) 23-1 and a random access sub-channel (RACH) 23-2. The SDCCH sub-channel 23-1 is used to transport information between the BTS 15 and a specific mobile users 18 to complete call set up or for transmission of messages from a mobile user in idle mode. The RACH sub-channel 23-2 is used by the mobile user to request access to the network during initial call set up.

Figure 3B:
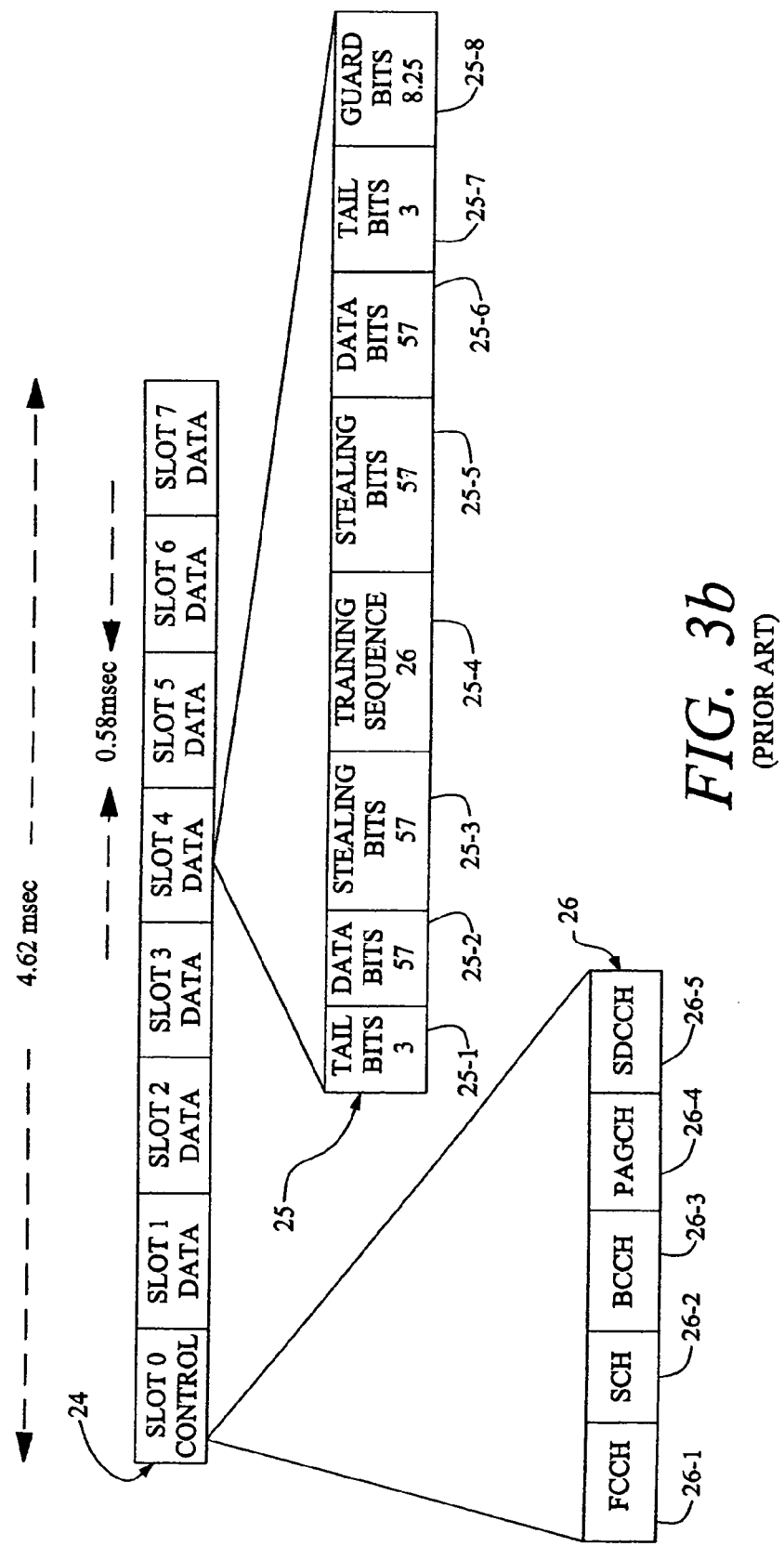
FIG. 3b illustrates a downlink GSM-type TDMA frame which includes a dedicated control channel.

FIG. 3*b* shows a typical GSM-type eight time slot TDMA frame 24 used for BTS 15 to translating repeater 12 communications. Generally, the information format in the traffic time slots 1–7 remains the same compared to uplink traffic channels shown in FIG. 3*a*. However, more control sub-channels are included in the control time slot 0 as shown in detail 26 in FIG. 3*b*, compared to the corresponding uplink control channel shown in detail 23 of FIG. 3*a*. Specifically, as shown in FIG. 3*b*, downlink control time slot 0 is comprised of frequency correction sub-channel (FCCH) 26-1, synchronization sub-channel (SCH) 26-2, broadcast control sub-channel (BCCH) 26-3, paging and access grant sub-channel (PAGCH) 26-4 and SDCCH sub-channel 26-5. The FCCH sub-channel 26-1 transmits frequency correction information (through translating repeater 12) for a mobile user 18 to correct its time base, while the SCH 26-2 sub-channel transmits (through translating repeater 12) synchronization information for the mobile to synchronize to the framing structure of the network. The BCCH 26-3 sub-channel transmits (through translating repeater 12)

information to idle mobile users 18 such as local area identification and neighbor cell information. Finally, the PAGCH 26-4 sub-channel is used (through translating repeater 12) to page a mobile user 18 and grant access to a mobile user 18 during call set up.

Figure 4:
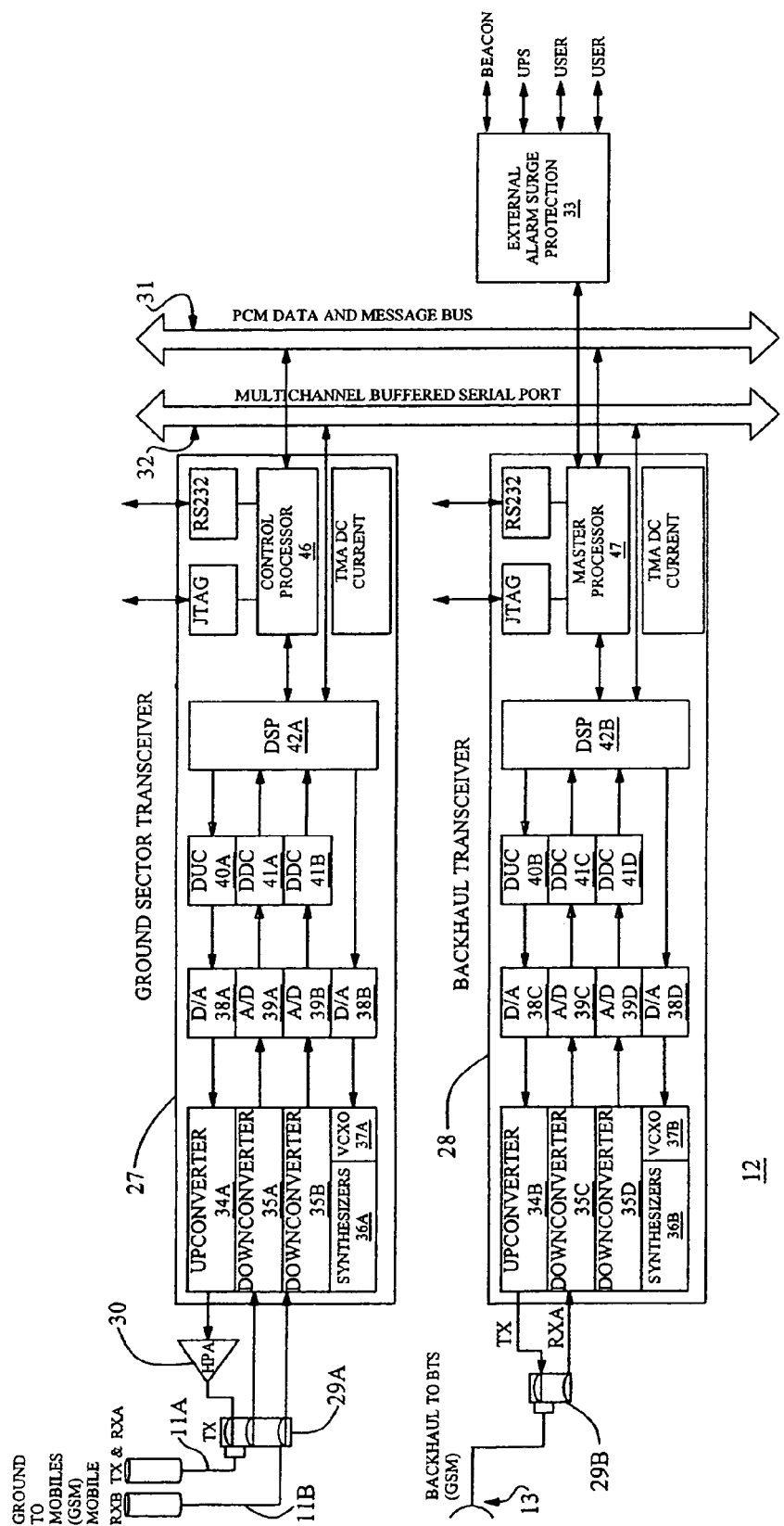
FIG. 4 is a detailed block diagram of a translating repeater of the type shown in the wireless communication system of FIG. 1.

FIG. 4 is a block diagram of a translating repeater 12 which can be used in connection with the present invention. Translating repeater 12 can comprise a ground sector transceiver 27 for communications with mobile users 18 and backhaul transceiver 28 for communications with host BTS 15. It will readily be appreciated by those skilled in the art that the particular transceiver architecture shown is not critical to the invention and the invention as described herein is not intended to be so limited.

In a preferred embodiment, transceivers 27 and 28 are each capable of transmitting and receiving over a broad range of carrier frequencies allocated to a service provider for multi-carrier operation. However, the invention is not limited in this regard and more narrowbanded transceivers can also be used for the purposes of the present invention. Each transceiver 27, 28 is preferably configured so that its operation can be controlled by control processor and master processor, 46 and 47, respectively.

FIG. 4 shows a single sector omni-directional translating repeater 12 according to a preferred embodiment of the invention, it being understood that the invention is not so limited. In the receive direction, voice or data signals are encoded and transmitted by mobile users 18 using a standard wireless telephony format such as GSM. Mobile signals are received by omni-directional antenna 11A and 11B. Received signals pass through cavity filter 29A to downconverter 35A or, alternatively, 35B where, in conjunction with synthesizer module 36A and voltage-controlled crystal oscillator 37A, the signal is mixed down to intermediate frequency or IF. A high-speed analog-to-digital converter 39A (or 39B) then converts the analog IF signal into a digital signal.

Once the IF signal is digitized, digital downconverter 41A (or 41B) translates the signal down to a complex baseband signal. Digital downconverter 41 preferably provides the ability to downconvert, decimate, filter and control the power level of the signal. After conversion to complex baseband, the signal is demodulated by digital signal processor 42A. Digital signal processor 42A is configured for decoding the received signal data from the standard wireless telephony format, such as GSM, to a common format used internally within translating repeaters 12.

The common format data is then transferred over multi-channel buffered serial port 32 to digital signal processor 42B in backhaul transceiver 28. The signal is re-modulated by digital signal processor 42B. The re-modulated signal is output as a complex baseband signal and translated to real IF by digital upconverter 40B. After the signal is translated to real IF, digital-to-analog converter 38C (or 38D) converts the signal back to an analog signal where it is mixed by upconverter 34B in conjunction with synthesizer module 36B and voltage-controlled crystal oscillator 37B to RF. The signal then passes through cavity filter 29B and is transmitted via translating repeater directional antenna 13 on uplink backhaul channel 19-1 to BTS 15.

Transceivers 27 and 28 are preferably controlled by one or more control circuits. The control circuits can be in the form of general purpose computers interfaced with the transceiver, a programmable microprocessor integrated with the transceivers with appropriate software, a hardware based controller, or any other combination of microprocessors, electronic circuitry and programming as may be necessary or appropriate for controlling the first and second transceivers. As shown in FIG. 4, the control circuits include master processor 47 and control processor 46. Master processor 47 preferably controls the operation of backhaul transceiver 28, including selection of transmit and receive frequencies. Master processor 47 is also preferably linked with PCM data and message bus 31 so that it can communicate with control processor 46, and vice versa. Control processor 46 is preferably a slave processor controlled by master processor 47. Control processor 46 can also preferably control the operation of ground sector transceiver 27, including the selection of transceiver receive and transmit frequencies.

Frequency translation of signals by translating repeater 12 received from the BTS 15 through the backhaul channel 19-2 is similar to the procedure employed to translate signals received from mobile users 18. Specifically, a signal is received from BTS 15 at translating repeater directional antenna 13 attached to backhaul transceiver 28. The signal passes through cavity filter 29B to downconverter 35C (or 35D) where, in conjunction with synthesizer module 36B and voltage-controlled crystal oscillator 37B, the signal is mixed down to IF. Analog-to-digital converter 39C (or 39D) converts the analog IF signal to a digital signal where it is subsequently processed by digital downconverter 41C (or 41D) to complex baseband.

Once converted into complex baseband, the signal is demodulated by digital signal processor 42B and transferred to digital signal processor 42A over multi-channel buffered serial port 32. The signal is then re-modulated by digital signal processor 42A and translated from complex baseband to real IF by digital upconverter 40A. After the signal is translated to real IF, digital-to-analog converter 38A (or 38B) converts the signal back to an analog signal. Upconverter 34A, synthesizer 36A, and voltage-controlled crystal oscillator 37A operate together to mix the signal to RF for transmission. The signal is then amplified by high-power amplifier 30, filtered by cavity filter 29A and transmitted from omni-directional antenna 11A to the mobile user 18 through groundlink channel 20-2.

Figure 5:
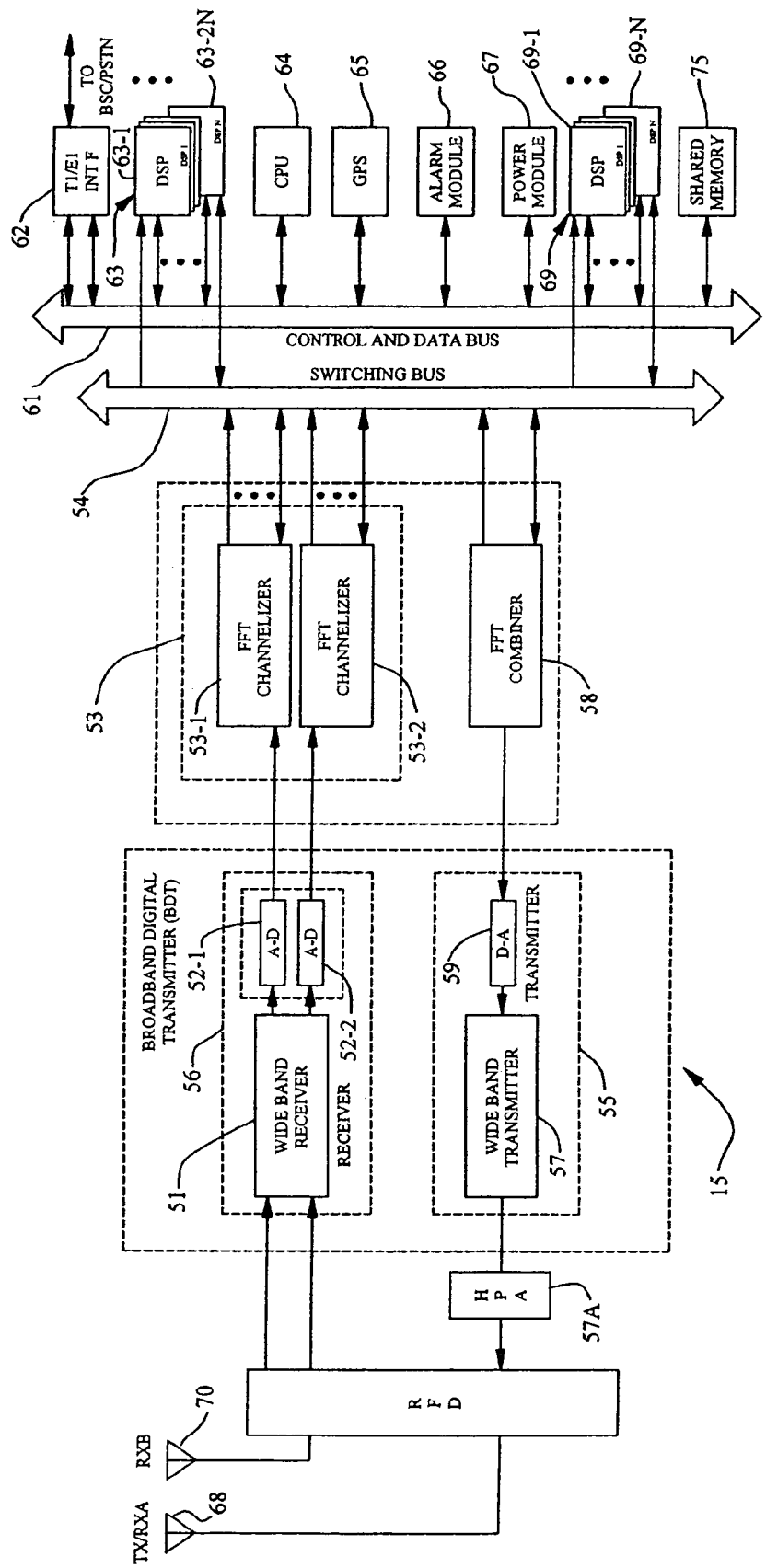
FIG. 5 is a block diagram of a base transceiver station of the type shown in the wireless communication system of FIG. 1.

Referring now to FIG. 5, a simplified block diagram of a broadband BTS 15 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68, 70 and a wideband receiver 51 capable of receiving a plurality of carrier frequency channels. Signals from the received channels can include new power requests, power adjustment requests and traffic channel data originating from mobile users 18.

The output of the wideband receiver 51 is downconverted and then preferably coupled to high speed A-D converters 52-1 and 52-2 which can be operated in parallel for diversity receive capability. Where diversity capability is not desired, a single A-D converted 52-1 can be utilized. Additionally, more than one parallel leg may be required for sectorized applications.

The channelized outputs from the A-D converters 52-1 and 52-2 are preferably input to FFT channelizers 53-1 and 53-2 which extract respective narrowband carrier frequency channel signals from the composite digitized multi-channel signals. The respective carrier frequency channel signals are then coupled via N output links through a common data bus 61 to respective digital signal processing receiver units 63-1 . . . 63-2N, each of which demodulates the received signal and perform any associated error correction processing embedded in the modulated signal.

The transmitter section 55 includes a second plurality of digital signal processing units, specifically, transmitter digital signal processing units 69-1 . . . 69-N. Transmitter digital signal processing units 69 are coupled to receive from the telephony network respective ones of a plurality of channels containing digital voice/data communication signals to be transmitted over respectively different individual carrier frequency channels of the multi-channel network.

Transmitter digital signal processing units 69 modulate and perform pretransmission error correction processing on respective incoming communication signals, and supply processed carrier frequency channel signals over the common bus 54 to preferably respective input ports of an inverse FFT-based multi-channel combiner unit 58.

The combiner 58 outputs a composite multi-channel digital signal to digital-to-analog (D-A) converter 59. The output of D-A converter 59 is coupled to a wideband (multi-channel) transmitter unit 57, which can include or have a separate multi-channel high power amplifier (HPA) 57A. The transmitter unit 57 transmits a wideband (multi-channel) communication channel signal defined by the composite signal output of the inverse fast Fourier transform-based combiner unit 58. The output of the HPA 57A is then coupled to antenna 68 for transmission.

With this background in mind, a method is provided for multiple communication signals between BTS 15 and multiple translating repeaters 12 to use the same backhaul channel concurrently. The invention takes advantage periods of voice inactivity that occur during a normal voice conversation. For example, in a conventional GSM cellular system using discontinuous transmit (DTX), during respective periods of voice inactivity the mobile user 18 and BTS 15 do not generally transmit anything. Packet based communications permit these "gaps" to be filled with packet based communication data from sources other than the endpoints of a given voice call. Since during a normal conversation only one side of the conversation is typically active at any particular point in time, capacity utilization of the backhaul link could potentially be doubled or more by utilizing gap intervals. However, the DTX standard requires a minimum level of information to be periodically transmitted even when no one is speaking. This feature is called Silence Indication Descriptor (SID) frames. SID frames generate background noise and the receive end uses it to replicate background noise. Thus, SID provides a comfort noise level so the receiving end does not think a call has been dropped. Preferably, if used, SID frames could also be packetized.

Using a digitizing translating repeater 12, data packets can be transmitted to BTS 15 whether translating repeater 12 receives packets or conventional circuit-switched transmissions of continuous voice-signal traffic information from mobile users 18. Digitizing translating repeater preferably includes structures for modulation, coding, demodulation and decoding RF signals as well as memory sufficient for storing data while awaiting re-transmission to the BTS 15 or mobile user 18. Memory for this purpose can be provided by DSPs 42A or 42B, which in the preferred embodiment include appropriate associated memory.

Digitizing translating repeater 12 can convert conventional circuit-switched transmissions of continuous voice-signal traffic information received from mobile users 18 into discrete packet-based traffic data for transmission to BTS 15 on the uplink backhaul channel 19-1. Similarly, packet based transmissions received from BTS 15 by the digitizing translating repeater 12 on downlink backhaul channel 19-2 can be retransmitted as data packets or converted to circuit switched transmissions for retransmission to mobile users 18.

Wireless communications can be converted between circuit switched and packet switched by translating repeater 12 using techniques similar to those known in the art for implementing VoIP (Voice over IP). VoIP is currently used for voice communications over the Internet. Preferably, this conversion is implemented by software.

In the case of GSM voice, speech is encoded in 20 ms blocks which are encoded using speech compression techniques to approximately 320 bits. The 20 ms blocks are interleaved with other speech blocks and transmitted over 8 bursts per frame. The 320 bits applies to GSM full rate (FR) and enhanced full rate (EFR) vocoders. This technique achieves an effective data rate of approximately 13 kps. These GSM speech blocks can be encapsulated by translating repeater 12 into packets rather than dedicated channels for retransmission to BTS 15 on the uplink or de-encapsulated into GSM speech blocks for transmission to mobile users 18. Analogous techniques can be implemented to perform analogous conversions for systems using alternate air interface standards, such as CDMA.

Packet based transmission of traffic information can be performed in much the same manner in which packet-based information is currently transmitted in voice over internet protocol (IP) networks. To accommodate multiple repeaters 12 using the same backhaul channel or channels, BTS 15 can schedule transfers between multiple translating repeaters 12 and itself. In some cases, BTS 15 may grant permission to transmit fewer packets than the translating repeater 12 has available to send. For example, BTS 15 may limit transfers from a translating repeater 12 which has a large block of data to ensure that other translating repeaters 12 have the opportunity to access available traffic channels in a timely manner.

The term "channel" as used in this specification refers to a set of parameters that identify a transmission path. For example, in TDMA systems, a channel is defined by a frequency, time slot and may include a transmission period. The method involves two basic types of channels; an access control channel (ACCH) and a packet data traffic channel (PTCH). The ACCH consists of an uplink packet data control channel and a downlink packet data control channel. Likewise, the PTCH consists of an uplink packet data traffic channel and a downlink packet data traffic channel. While the invention may be practiced in any one of a number of air interface protocols such as AMPS, CDMA, FDMA, etc., the following description will often be in terms of a specific GSM TDMA embodiment.

PTCHs can be contrasted with standard GSM TCHs. A GSM TCH is dedicated to one specific mobile user 18 while that mobile user 18 is on an active call. In contrast, a single PTCH may be used concurrently with multiple active mobile users 18. As such, the PTCH is more similar to the GSM General Packet Radio Service Packet data channel (PDCH), where multiple GPRS mobiles may use the same PDCHs concurrently.

Regarding a comparison of ACCHs and GSM control channels (CCHs), the ACCH is closely related to the GSM RACH (uplink) and GSM AGCH (downlink). On the uplink, for example, in GSM (and GPRS), the RACH is used simply by the mobile user 18 and retransmitted by the translating repeater 12 to BTS 15 to request access to the network. Similarly, the invention uses an ACCH signal transmitted by translating repeater 12 to allow a requesting mobile user 18 to gain system access. However, unlike the RACH, the ACCH can also be used to specify how much packet data translating repeater 12 has to transfer. The GSM AGCH is used to respond to the mobile user 18 (through translating repeater 12) and assign it to another channel (SDCCH for GSM) for transfer of information. The ACCH performs the same function, but also can specify how long and when the mobile user 18 can have access to the assigned one or more PTCHs. As described later, the ACCH can also be used in both the uplink and downlink directions to acknowledge the transfer of packets. There is typically no acknowledgment in GSM, while GPRS handles acknowledgment at a higher level.

A PTCH can be used to transfer actual communication payloads, such as voice or other data. Multiple PTCHs can be aggregated and used for higher capacity transfers of traffic from a single translating repeater 12. In addition, the ACCH can be used on the uplink (translating repeater 12 to BTS 15). The ACCH can be used by translating repeaters 12 to request one or more PTCHs to transfer packets of data. The uplink ACCH request can indicate how many packets of data are awaiting transmission. On the downlink (BTS 15 to translating repeater 12), the ACCH can be used to grant access for translating repeaters 12 to transmit packet data. The downlink ACCH message can indicate which PTCHs may be used and/or the number of packets that may be transmitted. The downlink message also can inform the translating repeater 12 that BTS 15 has packets of data to send it, indicating when, where (PTCHs) and the quantity of data packets. The ACCH may also be used to acknowledge successful transfers over PTCHs. Acknowledgment will be described later.

Figure 6:
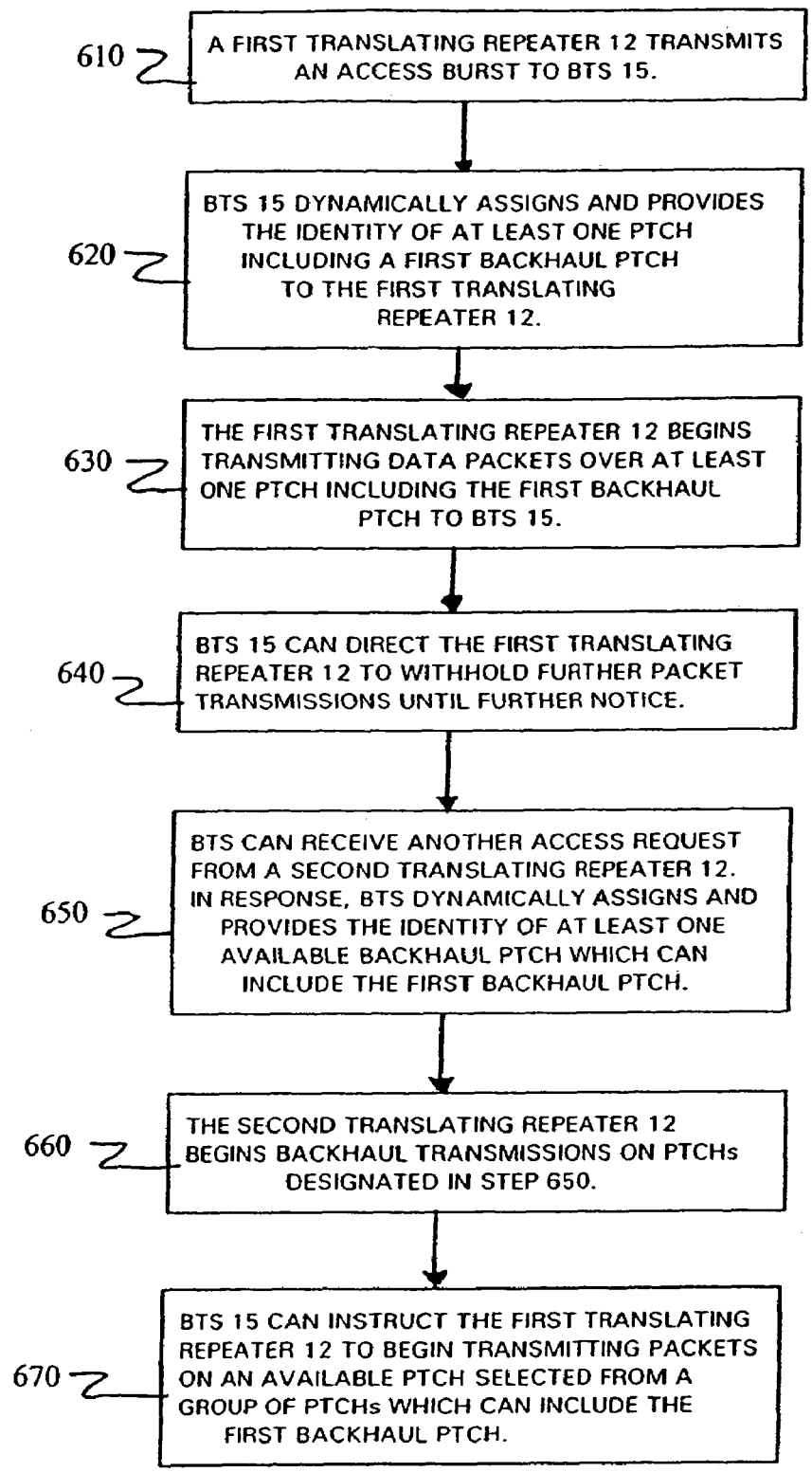
FIG. 6 is a flowchart describing a method for multiple translating repeaters to share the same backhaul packet channel for backhaul communications with a base transceiver station (BTS).

Referring to FIG. 6, in step 610 a first translating repeater 12 can transmit an access burst, such as a GSM RACH type burst to BTS 15 in GSM systems, identifying to BTS 15 that the translating repeater 12 has information packets to transmit to BTS 15. The request can optionally include the number of packets of data the first translating repeater 12 has to transmit. RACH is a relatively short duration access burst having a duration short enough to virtually assure noninterference between timing advances. However, using a RACH type burst is only one access method. Allocating one or more specific burst periods for each translating repeater 12 served is another access method. The latter method may be desirable as the traffic becomes relatively heavy to avoid collisions between signals originating from multiple simultaneous requesting translating repeaters 12 which can result from use of the RACH method. Preferably, access requests are sent over the ACCH.

Requesting first translating repeater 12 can have packet data to transmit including, for example, at least one packet of packetized call data to transmit from a call received from a mobile user 18, the call having a duration. In response to receipt of the access burst, in step 620, BTS 15 can dynamically assign and provide the identity of at least one available first backhaul PTCH to the requesting first translating repeater 12. The BTS 15 preferably schedules the use of PTCHs in an effort to distribute system capacity and to minimize delays in packet transmissions.

For example, BTS 15 can transmit a PAGCH burst to the requesting first translating repeater 12 identifying to the first translating repeater 12 that it should set itself to one or more specified backhaul PTCHs. However, a SDDCH burst followed by a PAGCH burst is not an efficient method for packet data communications. Upon receipt of the access request, BTS 15 can preferably determine the number of PTCHs that are available for uplink transfer and transmit a message to the requesting translating repeater 12 identifying which PTCHs and the number of frames (maximum of 8 PTCHs in a frame for GSM systems) it may use. This determination can result in BTS 15 limiting the translating repeater's 12 transfer to less data than the translating repeater 12 has to transmit.

Alternatively, BTS 15 can make one or more PTCHs available to a requesting translating repeater 12 without allocating a predetermined number of frames, and await one or more subsequent events to determine the number of frames available to translating repeater 12. For example, BTS 15 can wait until a gap is detected in data transmissions received to determine the number of frames allocated. However, the former method is preferred because under the former method, one or more translating repeaters 12 cannot generally dominate the system's available PTCHs. If BTS 15 limits the transfer to less data than the translating repeater 12 has to transmit, BTS 15 can send another message to the translating repeater 12 over the ACCH to schedule when and where (particular PTCHs) to transmit some or all remaining data packets.

Uplink and downlink PTCHs may be assigned together by BTS 15 in response to a request by translating repeater 12. However, alternatively and preferably, uplink and downlink PTCHs may be assigned separately to more efficiently utilize the system's backhaul bandwidth.

Once set to the specified PTCHs, in step 630, the first translating repeater 12 can begin transmitting packets of data to BTS 15 over the specified one or more PTCHs. Assuming BTS 15 identifies which PTCHs and the number of frames on each specified PTCH to the translating repeater 12, the translating repeater 12 can transmit packets of data on the specified PTCHs for the number of frames respectively, specified, unless later interrupted by BTS 15.

In step 640, BTS 15 can optionally direct the first translating repeater 12 to withhold transmission of additional packets until further notice. For example, BTS 15 can request the first translating repeater 12 to withhold further transmission after detecting the absence of voice packets over a predetermined time interval or in response to the receipt of a channel request from a higher priority call. However, it is not normally necessary for the BTS 15 to request that the translating repeater 12 stop transmitting packets, since BTS 15 generally informs the translating repeater 12 when and how many packets to transmit. Moreover, BTS 15 does not generally have a need to interrupt already scheduled translating repeater 12 packet transmissions.

Analogous to steps 610 and 620 respectively, in step 650, in response to the receipt of an access request from a second translating repeater 12 to send data packets, BTS 15 can instruct the second translating repeater 12 to begin transmitting data packets over one or more available backhaul PTCHs. In addition, BTS 15 can also provide the number of packets that may be transmitted over the assigned one or more PTCHs. BTS 15 can schedule the second translating repeater 12 transmissions on the same PTCHs used by first translating repeater 12 after the first translating repeater 12 has completed its packet transfers. Alternatively, BTS 15 can instruct the second translating repeater 12 to transmit sooner if there are other PTCHs that are idle or become available sooner. Available backhaul PTCHs for the second translating repeater 12 can include unused time intervals on the first backhaul PTCH during the duration of the first translating repeater's call. Thus, idle voice time intervals can be advantageously filled with data packets originating from other cellular system users.

In step 660, the second translating repeater can begin transmitting on PTCHs possibly including the first backhaul PTCH. In step 670, BTS 15 can instruct the first translating repeater 12 to again begin transmitting data packets. This will typically occur if in step 620 BTS 15 limited the first translating repeater's 12 transmission to less packets than the first translating repeater 12 had to send. The first translating repeater can begin transmission on any available backhaul PTCHs including the first backhaul PTCH, if available. It does not matter if the first translating repeater 12 is reallocated the original PTCHs or different PTCHs. For example, the first backhaul PTCH can become available after the second translating repeater 12 has completed its own transmission, an idle voice interval is detected on such PTCH by BTS 15, or the second translating repeater is directed by BTS 15 to withhold further transmissions. Alternatively, the first translating repeater 12 can begin packet transmissions on a backhaul PTCH other than the first backhaul PTCH. Thus, depending on the duty cycle of the active packet transmissions, a plurality of translating repeaters 12 can share the same backhaul PTCH during the duration of a voice call.

It is preferable to also include a method for acknowledging successful translating repeater 12 transfers or requests for retransmission of packets. As a low cost option, a cellular system could avoid the use of control bits in the data packets to implement this function. For example, whenever BTS 15 grants the use of one or more PTCHs, it can assign an identification number to that transfer. Upon successful transfer, the receiving end can transmit an acknowledgment message over the ACCH identifying that all packets were successfully received. If the transfer was not successful, BTS 15 can make a determination whether or not to retransmit (if the transfer were in the downlink direction) or request translating repeater 12 retransmit (if the transfer were in the uplink direction). If the data packets contain voice, BTS 15 may not want the voice data to be retransmitted. Accordingly, if the BTS 15 were the receiving end, BTS 15 could simply send an acknowledgment causing translating repeater 12 to dump its buffer of data packets stored in memory which were unsuccessfully transmitted.

If the translating repeater 12 were the receiving end, BTS 15 could send a negative acknowledgment message without a retransmission request. But if retransmission is desired and the translating repeater 12 is the receiving end, BTS 15 could retransmit the packets informing the translating repeater 12 that it is a retransmission, giving the appropriate identification number. Again via the ACCH, BTS 15 could provide information as to when and on which PTCHs the retransmission will take place. Likewise, if the receiving end is BTS 15, BTS 15 can send a negative acknowledgment message requesting retransmission again indicating over the ACCH when and on which PTCHs the retransmission is to take place.

The ability of BTS 15 to stop the transmission of data packets by a translating repeater 12 and to instruct the translating repeater 12 to temporarily discontinue transmissions until further notice provides several system advantages. First, it provides more efficient usage of the backhaul channel 19 bandwidth by allowing other translating repeaters utilize unused time intervals which occur during the duration of a given voice call. Second, it provides for the immediate prioritizing of call traffic by BTS 15, without the loss of transmitted information.

Similarly, using a simplified and nearly analogous method to the method described in FIG. 6, BTS 15 can use the same downlink backhaul channel to transmit packets of data over downlink PTCHs to two or more translating repeaters 12. However, for downlink backhaul packet communications, BTS 15 does not require the receipt of a request to transmit data packets (step 610).

Packet communications may also include a data priority field to indicate the relative priority of the data. If all backhaul PTCHs are currently allocated and a call request for a backhaul PTCH having a priority greater than any current active calls is received by BTS 15, then BTS 15 can terminate the connection between itself and the lower priority call connected through a given translating repeater 12. This method can be used to create an available PTCH for the priority call in situations in which all backhaul PTCHs are currently allocated.

The termination of any connection with a conventional non-digitizing translating repeater 12 will generally cause a loss of all of the information transmitted and received by the translating repeater 12. In the case of packet-based transmission of information over backhaul channel 19, BTS 15 can simply queue the transmission of the remaining, lower priority information packets until the completion of the transmission of the packets from the higher priority call. This queuing may cause a delay in the transmission of the lower priority information, but will not generally cause a loss of information.

Packet-based backhaul communications can be used regardless of the communication method used between the translating repeater 12 and mobile user 18. Packets for packet-based mobiles 18 can be passed through the translating repeater 18 over a packet-based backhaul channel 19-2. Circuit-switched mobile user data or voice 20-1 transmitted could be packetized by the translating repeater 12 and passed over the backhaul 19-1. Packetizing transmitted circuit switched cellular user voice communications could at least double the capacity of the uplink backhaul link 19-1 since voice activity on either side of a conversation is typically less than 50%.

Similarly, translating repeaters 12 can convert packets received over the downlink backhaul channel 19-2 from BTS 15 to circuit switched communication signals to provide mobile users 18 with circuit switched voice or data when desired. In this situation, the ability to maintain packetized downlink communications could at least double the capacity of the downlink backhaul link 19-2, even when circuit switched voice or data is transmitted to mobile users 18.

Backhaul efficiencies can be further increased if the use of vacant voice channel intervals can be combined with compatible backhaul efficiency enhancing techniques. One such compatible technique is the use of any suitable higher-order backhaul 19 modulation scheme, the higher order modulation scheme relative to the modulation scheme used for the groundlink 20.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof for an indication of the scope of the invention.

What is claimed is:

1. In a wireless cellular communication system comprising a cellular base station and at least one repeater communicating with said cellular base station over a wireless backhaul link for communicating with a plurality of mobile subscribers, a method for improved backhaul efficiency, comprising the steps of:

dynamically assigning for said backhaul link at least one packet channel for transmission of selected packets containing traffic data on a backhaul signal for a subscriber, said at least one packet channel comprising at least an RF frequency and a channel definition;

transmitting said selected packets on said at least one packet channel between said at least one repeater and said cellular base station; and dynamically reassigning at least a portion of said assigned packet channel for transmission of a second backhaul signal.

2. The method according to claim 1, further comprising the step of performing said assigning step in response to a request for communicating over said backhaul signal for one of said plurality of mobile subscribers.

3. The method according to claim 2, wherein said request include a priority field.

4. The method according to claim 3, further comprising a comparing step wherein said data priority fields are compared to determine whether to terminate transmission of a lower priority transmission to allow transmission of a higher priority transmission.

5. The method according to claim 1, wherein said channel definition includes a set of parameters which define said packet channel, said parameters comprising at least one of:
   a. a number of said selected packets which can be sent over said assigned packet channel; and
   b. a number of frames allocated for transmission of said selected packets.

6. The method according to claim 5, wherein said channel definition further includes an identified time for transmission of said selected packets.

7. The method according to claim 5, wherein said backhaul signal comprises at least one data type selected from the group consisting of user traffic and control data.

8. The method according to claim 7 wherein said user traffic is comprised of voice traffic.

9. The method according to claim 1, wherein said packets are transmitted over said backhaul link using a higher order modulation as compared to a ground link between said at least one repeater and said subscriber.

10. In a wireless cellular communication system comprising a cellular base station and at least one repeater communicating with said cellular base station over a wireless backhaul link for communicating with a plurality of mobile subscribers, a method for improved backhaul efficiency, comprising the steps of:

dynamically assigning for said backhaul link at least one packet channel for transmission of selected packets containing traffic data on a backhaul signal for a subscriber, said at least one packet channel comprising at least an RF frequency and a channel definition;

transmitting said selected packets on said at least one packet channel between said at least one repeater and said cellular base station; and converting between a packet based backhaul signal and a non-packet based ground link signal.

11. In a wireless cellular communication system comprising a cellular base station and at least one repeater communicating with said cellular base station over a wireless backhaul link for communicating with a plurality of mobile subscribers, a method for improved backhaul efficiency, comprising the steps of:

dynamically assigning for said backhaul link at least one packet channel for transmission of selected packets containing traffic data on a backhaul signal for a subscriber, said at least one packet channel comprising at feast an RF frequency and a channel definition; and transmitting said selected packets on said at least one packet channel between said at least one repeater and said cellular base station;

wherein said at least one repeater comprises a plurality of repeaters, wherein one of said at least one packet channel is used to transmit packets between multiple repeaters selected from said plurality of repeaters and said cellular base station.

12. In a wireless cellular communication system comprising a cellular base station and a repeater communicating with said cellular base station over a wireless backhaul link for communicating with a plurality of mobile subscribers, a system for improved backhaul efficiency, comprising:

a structure for dynamically assigning for said backhaul link at least one packet channel for transmission of selected packets containing traffic data on a backhaul signal for a subscriber, said at least one packet channel comprising at least an RF frequency and a channel definition;

structure for transmitting said selected packets on said at least one packet channel between said repeater and said cellular base station; and structure for dynamically reassigning at least a portion of said assigned packet channel for transmission of a second backhaul signal.

13. The system according to claim 12, further comprising a structure for performing said assigning step in response to a request for communicating over said backhaul signal for one of said plurality of mobile subscribers.

14. The system according to claim 13, wherein said request include a data priority field.

15. The system according to claim 14, further comprising a structure for comparing wherein said data priority fields are compared to determine whether to terminate transmission of a lower priority transmission to allow transmission of a higher priority transmission.

16. The system according to claim 12, wherein said channel definition includes a set of parameters which define said packet channel, said parameters comprising at least one of:
   a. a number of said selected packets which can be sent over said assigned packet channel; and
   b. a number of frames allocated for transmission of said selected packets.

17. The system according to claim 16, wherein said channel definition further includes an identified time for transmission of said selected packets.

18. The system according to claim 16, wherein said backhaul signal comprises at least one data type selected from the group consisting of user traffic and control data.

19. The system according to claim 18, wherein said user traffic is comprised of voice traffic.

20. The system according to claim 12, further comprising a structure for transmitting said packets over said backhaul link using a higher order modulation as compared to a ground link signal between said at least one repeater and said subscriber.

21. In a wireless cellular communication system comprising a cellular base station and a repeater communicating with said cellular base station over a wireless backhaul link for communicating with a plurality of mobile subscribers, a system for improved backhaul efficiency, comprising:

a structure for dynamically assigning for said backhaul link at least one packet channel for transmission of selected packets containing traffic data on a backhaul signal for a subscriber, said at least one packet channel comprising at least an RF frequency and a channel definition;

a structure for transmitting said selected packets on said at least one packet channel between said repeater and said cellular base station; and a structure for converting between a packet based backhaul signal and a non-packet based ground link signal.

22. In a wireless cellular communication system comprising a cellular base station and a repeater communicating with said cellular base station over a wireless backhaul link for communicating with a plurality of mobile subscribers, a system for improved backhaul efficiency, comprising:

a structure for dynamically assigning for said backhaul link at least one packet channel for transmission of selected packets containing traffic data on a backhaul signal for a subscriber, said at least one packet channel comprising at least an RF frequency and a channel definition; and a structure for transmitting said selected packets on said at least one packet channel between said repeater and said cellular base station;

wherein said at least one repeater comprises a plurality of repeaters, wherein said structure for transmitting said selected packets on one of said at least one packet channel is used to support communications between multiple repeaters selected from said plurality of repeaters and said cellular base station.

* * * * *